United States Patent [19]

Voos et al.

[11] 4,073,312

[45] Feb. 14, 1978

[54] CHARGE AND RELIEF VALVE

[75] Inventors: Frank J. Voos, Stratford, Conn.; David M. Magoulick, Uniontown, Ohio

[73] Assignee: National Distillers and Chemical Corporation, New York, N.Y.

[21] Appl. No.: 698,618

[22] Filed: June 21, 1976

[51] Int. Cl.² ............ F15B 13/04; F16K 11/00
[52] U.S. Cl. .................... 137/877; 91/454; 137/353; 137/596.2; 297/345
[58] Field of Search ............ 91/454; 137/596.2, 612.1, 137/226, 353, 360; 297/345, DIG. 8, DIG. 3

[56] References Cited

U.S. PATENT DOCUMENTS

| 241,847 | 5/1881 | Eichert | 137/596.2 X |
| 1,223,621 | 4/1917 | Scherenzel | 91/432 X |
| 3,154,099 | 10/1964 | Long, Jr. et al. | 137/596.2 |
| 3,166,991 | 1/1965 | Blenkle | 91/454 X |
| 3,188,103 | 6/1965 | Von Lowis | 137/596.2 X |
| 3,545,479 | 12/1970 | Coe | 137/360 |
| 3,714,968 | 2/1973 | Billeter | 137/596.2 |

FOREIGN PATENT DOCUMENTS

| 664,652 | 6/1963 | Canada | 137/596.2 |
| 866,778 | 5/1961 | United Kingdom | 137/596.2 |

Primary Examiner—Irwin C. Cohen
Attorney, Agent, or Firm—Kenneth D. Tremain

[57] ABSTRACT

A dual valve assembly having a charge and relief valve, comprising a unitary valve structure including a thick central body section and, extending therefrom, a pair of elongated hollow cylindrical valve members. A valve core is threaded into the bore of each valve member and a conventional valve cap is screwed onto the free end of one member, which end is adapted to be connected to an air source. A spring-biased plunger-cap or assembly is threaded onto the free end of the other valve member, the plunger being operable to engage the pin of the valve core at that end so as selectively to relieve the pressure. A passageway in the central section communicates with both of the bores and by a hose connection, with a pneumatic device whose operation is to be controlled.

2 Claims, 1 Drawing Figure

CHARGE AND RELIEF VALVE

BACKGROUND, OBJECTS AND SUMMARY OF THE INVENTION

The present invention pertains to a unitary valve structure, and more particularly, to a dual valve assembly which uniquely incorporates the functions of a charge and relief valve in controlling pressure to and from devices operable by means of air pressure.

In order to provide some background for the present invention, reference may be made to multiple or dual valve assemblies or like structures, as, for example, that disclosed in U.S. Pat. No. 1,484,342, which assembly involves an adapter for pump couplings including multiple valve cores.

Although there is provision in the valve assembly disclosed in U.S. Pat. No. 1,484,342 for the utilization of two standard valve cores within bores in a valve body, nevertheless the whole purpose therein is directed to an operation involving the use of a pressure gauge, therefore necessarily involving the actuation or manipulation of two valve stems and accordingly, requiring that both of the valve cores be actuated in order to pass air into a utilization device such as a tire. Such an arrangement is antithetical to the purpose and function of the present invention.

Instead of the above-described prior art arrangement, the present invention envisions the simple and ready adjustability, by means of a plunger cap, having a suitable vent hole, of the pressure which is being supplied to a vehicle seat or like device which is operable by means of air pressure.

Accordingly, it is a primary object of the present invention to make feasible and convenient the connection to pressure lines in order to furnish pressure to a device such as a seat mechanism, and yet to permit easy adjustability and convenience in regulating the pressure to suit, for example, a driver's comfort in respect to position and height in the use of the pneumatically operated vehicle seat.

Another and more specific object is to permit ready access in furnishing pressure to a vehicle seat or the like from a position on one side, for example, of a bulkhead such as between a truck cab and an engine compartment. To this end the dual valve assembly is so arranged that one end of the assembly with its valve means is available to project into the aforesaid engine compartment or the like and the other end, furnished with a similar or corresponding valve means, is readily accessible within the truck cab for the driver's convenience in adjusting the air-controlled seat.

It will be appreciated that although reference has been made hereinabove to the specific example of the operation of a vehicle seat, the dual valve assembly of the present invention is just as easily utilizable in other controls involving the general use of air bags, air springs, or other devices that employ air pressure and in which the same desirable ends are to be realized or achieved.

The above-noted objects are implemented by a primary feature of the present invention involving a unitary valve assembly which includes charge and relief valves which communicate through a central body section with a pneumatic device whose operation is to be affected. Specifically, the present invention involves a unitary valve structure or assembly comprising a central valve body section and a pair of integrally formed valves, each including a hollow valve cylinder extending from said body section; a pair of substantially identical valve core means within the respective bores defined by the hollow valve cylinders; a passageway through said body section communicating with the respective bores in the valve cylinders, said integrally-formed valves constituting independently operable means for respectively charging and relieving air pressure furnished to a utilization device; and means adapted to be connected to the free end of the first valve cylinder for contacting the pin of its core so as to produce relief or bleeding off of pressure from utilization device; and means adapted to be connected to the free end of the second valve cylinder for supplying air therethrough from a source so as to produce inflation of the utilization device.

Other and further objects, advantages and features of the present invention will be understood by reference to the following specification in conjunction with the annexed drawing, wherein like parts have been given like numbers.

DETAILED DESCRIPTION OF THE PREFERRED EMBODIMENT

Figure 1:
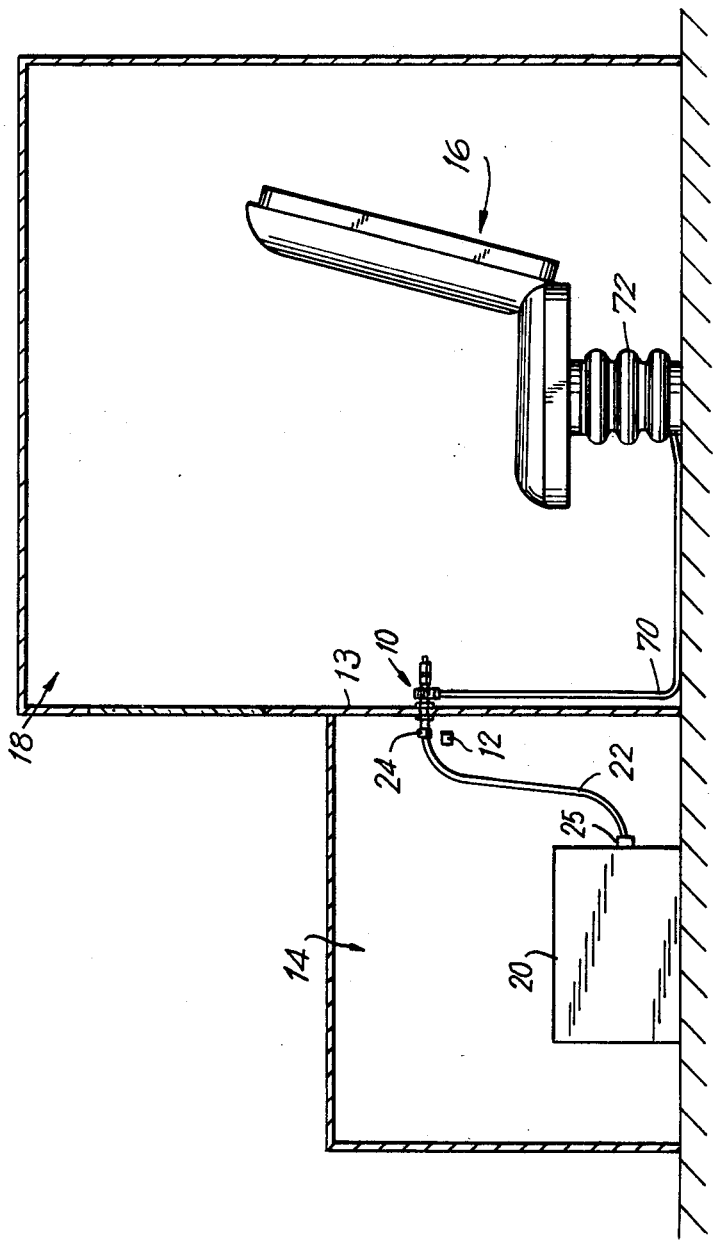
FIG. 1 is a perspective view of the valve assembly of the present invention shown mounted in a typical operating position and connected to a pneumatic device.
Figure 2:
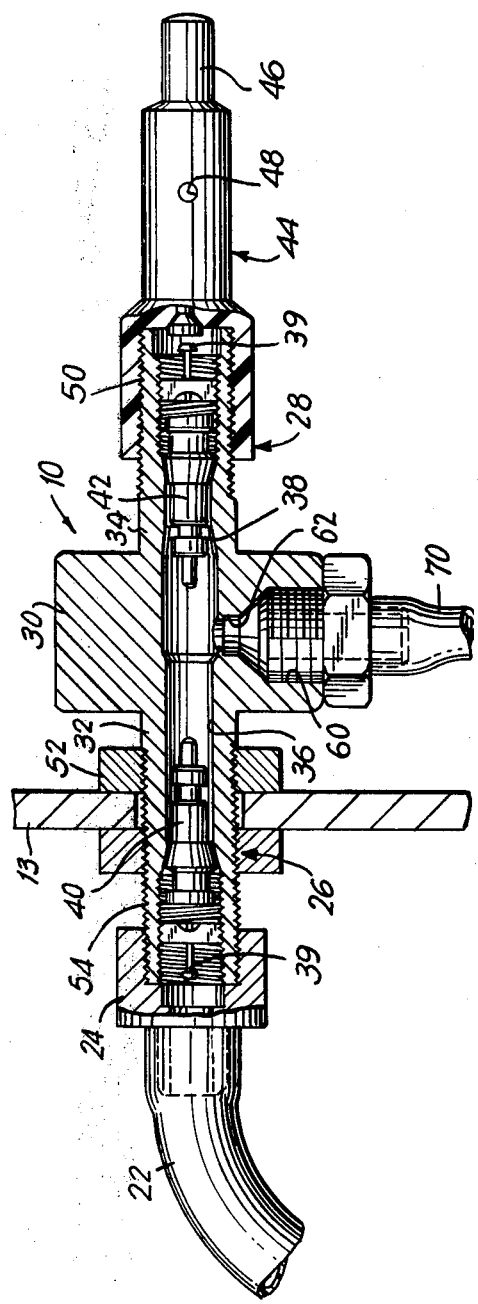
FIG. 2 is a cross-sectional view taken on the line 1—1 of FIG. 1 and particularly illustrating the internal parts or cores of the individual valve structures within the unitary valve assembly.

Referring now to FIGS. 1 and 2, the unitary or dual valve assembly 10 of the present invention is illustrated. Normally the left side or left end of the assembly is capped with a regular or standard valve cap 12 and this end of the assembly typically would extend from one side of a bulkhead or wall 13 into, for example, an engine compartment 14. The valve cap 12 would be removed when it is desired that air be furnished to a device 16, such as a vehicle seat, in the cab 18. The supply of air would come from a compressor 20 or other source by way of a hose 22 connected to the assembly by means of connector 24, and would be controlled by a separate valve 25.

The dual valve assembly 10 of the invention includes, in a unitary valve structure, two independently operable valves; that is, a charge valve 26 and a relief valve 28. The unitary valve structure includes a thick central body section 30, preferably hexagonal in outer configuration and, extending therefrom, a pair of elongated hollow valve cylinders 32 and 34.

For convenience and low cost manufacture, it will be seen in the preferred embodiment that the hollow cylindrical members 32 and 34 are formed on a common axis from either side of the thick body section 30 so that the bores 36 and 38 of the respective valve members can be formed in a single operation as extensions of each other on that axis.

Valve cores 40 and 42 are threadedly engaged with the internal threads within the respective bores 36 and 38. These bores are appropriately stepped or champered so as to provide good internal sealing and each of the valve cores includes a stem or pin 39 having a cap at its inner end which normally covers an outlet from the flow passage through the valve core.

The right-hand end of the valve assembly 10 is capped or terminated with a cap 44 including a spring biased plunger 46 and further including an aperture or vent hole 48. The plunger 46 is operable, by reason of contacting pin 39, to cause deflation or release of pressure when desired. The cap 44 is engaged with the external threads 50 on valve member of cylinder 34.

It will be seen in FIG. 1 that fastening means, in the form of suitable hex nuts 52, are provided so that they may be engaged, preferably with external threads 54 on valve cylinder 32 so that valve assembly 10 can be suitably attached or affixed to the bulkhead 13. If preferred, the valve assembly can be attached or mounted to a bracket or the like, wherever convenient.

A recess or bore 60 extends from another hexagonal face of the body section 30 of the valve assembly 10 and terminates in a narrow passageway 62 which communicates with the bores 36 and 38 of the valve members. Accordingly, it will be understood that valves 26 and 28 are independently operable, valve 26 acting to permit a flow of air to be furnished to a utilization device and serving as a check valve at other times; particularly when the other valve 28 is functioning as a bleeding or release valve by dint of operation of the plunger 46 on cap 44 whereby the stem or pin 39 of valve core 42 is engaged and air can then readily flow out by way of vent hole 48 in the cap.

When air is being supplied from compressor 20, there will be flow through the bore 60, thence to a hose 70 suitably connected to that bore and ultimately to an air bag 72 forming part of the vehicle seat 16. Accordingly, sufficient air can be supplied to the air bag to provide a comfortable level for the driver of the vehicle or the like. However, in the event that that driver, or another driver subsequently operating the vehicle, decides to decrease the pressure in the air bag, the plunger 46 on the cap 44 is pushed inwardly with consequent release of pressure such that the vehicle seat will be lowered.

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

What is claimed is:

1. A dual valve assembly for enabling ready access in relieving air pressure from a utilization device located on one side of a wall, and in furnishing air pressure to said utilization device from a source located on the opposite side of the wall, comprising
    (a) a unitary valve structure including a central body section and first and second integrally formed valves, each valve comprising
        (1) a hollow valve cylinder extending from said body section, and
        (2) a valve core, including a pin, within the bore defined by each valve cylinder;
    (b) a passageway through said central body section communicating with the respective bores in the valve cylinders such that said integrally formed valves constitute independently operable means for respectively charging and relieving air pressure in said valve assembly, said passageway intersecting at its one end substantially perpendicularly with the bores; and means at the other end of said passageway for connecting a hose thereto;
    (c) threads on the exterior surface of the first valve cylinder and a cap engaging said threads, said cap including a spring-biased plunger for contacting the pin of the valve core within said first valve cylinder so as to relieve the air pressure;
    (d) further threads on the exterior surface of the second valve cylinder, and a pair of fastening devices engaging said further threads for engaging respective opposite sides of said wall therebetween so that said valve assembly can be mounted on said wall such that the passageway in said central body section is located on said one side of the wall.

2. A device as defined in claim 1, in which the bores defined by the valve cylinders are extended from said central body section on a common axis.

* * * * *